US009727654B2

(12) United States Patent
Lytkin et al.

(10) Patent No.: US 9,727,654 B2
(45) Date of Patent: Aug. 8, 2017

(54) SUGGESTED KEYWORDS

(71) Applicant: LinkedIn Corporation, Mountain View, CA (US)

(72) Inventors: Nikita Igorevych Lytkin, Sunnyvale, CA (US); Aastha Jain, Sunnyvale, CA (US); Gloria Lau, Los Altos, CA (US); Vitaly Gordon, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 191 days.

(21) Appl. No.: 14/280,456

(22) Filed: May 16, 2014

(65) Prior Publication Data
US 2015/0331945 A1 Nov. 19, 2015

(51) Int. Cl.
G06F 17/30 (2006.01)
H04L 29/08 (2006.01)

(52) U.S. Cl.
CPC .... *G06F 17/30867* (2013.01); *G06F 17/3064* (2013.01); *G06F 17/30864* (2013.01); *H04L 67/02* (2013.01); *H04L 67/306* (2013.01)

(58) Field of Classification Search
CPC ... H04L 67/306; H04L 67/02; G06F 17/3053; G06F 17/30864; G06F 17/30867; G06F 17/3064
USPC ........................................ 707/722, 723, 736
See application file for complete search history.

(56) References Cited

U.S. PATENT DOCUMENTS

| 6,772,150 B1* | 8/2004 | Whitman .......... G06F 17/30448 707/721 |
| 8,468,143 B1* | 6/2013 | Oztekin ............ G06F 17/30554 707/706 |
| 8,538,957 B1* | 9/2013 | Zhou ................... G06F 17/2854 707/728 |
| 2006/0136405 A1 | 6/2006 | Ducatel et al. |
| 2007/0043761 A1 | 2/2007 | Chim et al. |
| 2008/0208815 A1* | 8/2008 | Taylor .................... G06Q 30/02 707/E17.001 |
| 2009/0094209 A1 | 4/2009 | Marvit et al. |
| 2009/0234727 A1* | 9/2009 | Petty ................. G06F 17/30306 705/14.54 |

(Continued)

FOREIGN PATENT DOCUMENTS

WO  WO-2015175100 A1  11/2015

OTHER PUBLICATIONS

"International Application Serial No. PCT/US2015/023163, International Search Report mailed Jun. 26, 2015", 2 pgs.

(Continued)

*Primary Examiner* — Phong Nguyen
(74) *Attorney, Agent, or Firm* — Schwegman Lundberg & Woessner, P.A.

(57) ABSTRACT

A method and system to suggest keywords to a social network member is described. A suggested keywords system, in one example embodiment, examines phrases that appear in profiles maintained by the on-line social networking system that are similar to the target profile and identifies those words and phrases that are most prominent in these profiles, utilizing discriminative strength values. These most prominent words and phrases may be presented to the target member as suggested keywords to be included in the member's professional summary.

20 Claims, 7 Drawing Sheets

(56) References Cited

U.S. PATENT DOCUMENTS

| | | | |
|---|---|---|---|
| 2011/0153423 A1* | 6/2011 | Elvekrog | G06Q 30/02 705/14.53 |
| 2011/0288935 A1* | 11/2011 | Elvekrog | G06Q 30/0241 705/14.53 |
| 2012/0210203 A1* | 8/2012 | Kandekar | G06F 17/30719 715/230 |
| 2013/0173610 A1 | 7/2013 | Hu et al. | |
| 2013/0262459 A1 | 10/2013 | Srikrishna et al. | |
| 2014/0046976 A1* | 2/2014 | Zhang | G06F 17/30483 707/772 |
| 2014/0101243 A1* | 4/2014 | Naveh | G06Q 50/01 709/204 |
| 2014/0156675 A1 | 6/2014 | Burstein et al. | |
| 2015/0331879 A1 | 11/2015 | Jain et al. | |

OTHER PUBLICATIONS

"International Application Serial No. PCT/US2015/023163, Written Opinion mailed Jun. 26, 2015", 12 pgs.

"U.S. Appl. No. 14/280,448, Non Final Office Action mailed Nov. 30, 2016", 21 pgs.

"International Application Serial No. PCT/US2015/023163, International Preliminary Report on Patentability mailed Dec. 1, 2016", 10 pgs.

"U.S. Appl. No. 14/280,448, Response filed Feb. 28, 2017 to Non Final Office Action mailed Nov. 30, 2016", 12 pgs.

\* cited by examiner

FIG. 5

SUGGESTED KEYWORDS

TECHNICAL FIELD

This application relates to the technical fields of software and/or hardware technology and, in one example embodiment, to system and method to suggest keywords to a social network member.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which:

FIG. 5 is a user interface diagram illustrating a summary section of a member profile representing a member of an on-line social network system and a presentation of suggested keywords, in accordance with an example embodiment;

DETAILED DESCRIPTION

Figure 1:
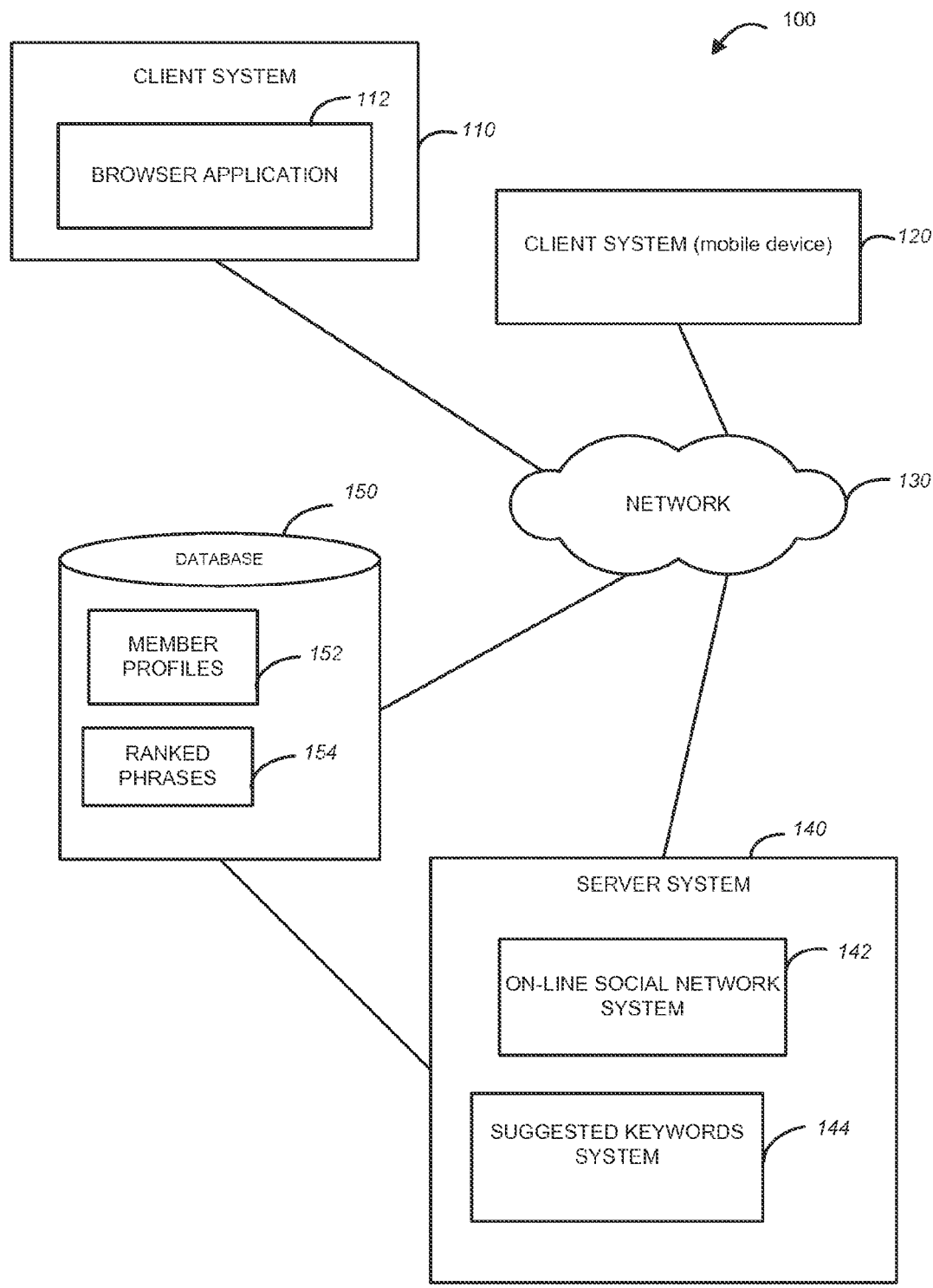
FIG. 1 is a diagrammatic representation of a network environment within which an example method and system to suggest keywords to a social network member may be implemented.

A method and system to suggest keywords to a social network member in an on-line social network is described.

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of theonline social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information provided by the member's connections. Information provided by the member's connections may be, e.g., recommendations, endorsements and skills. The profile of a member may include several items or units of a profile. For example one unit of a profile may contain information about the member's education, while another unit may contain information about the member's current and past employment. The profile of a member may also include a profile summary, e.g., a professional summary of a member that summarizes professional experience and achievements of a member. The task of creating a professional summary may be challenging for an individual, as it may require creative synthesis of the information from the entire profile. At the same time, the content of a profile summary may be very important as it may affect the ranking of a member (e.g., professional ranking) in the on-line social network. A professional summary of a member may be viewed by employment recruiters who are interested in understanding a candidate's professional background. Thus, a poorly constructed summary may result in fewer professional opportunities for a member and may also affect how the profile of the member appears in search results.

Figure 5:
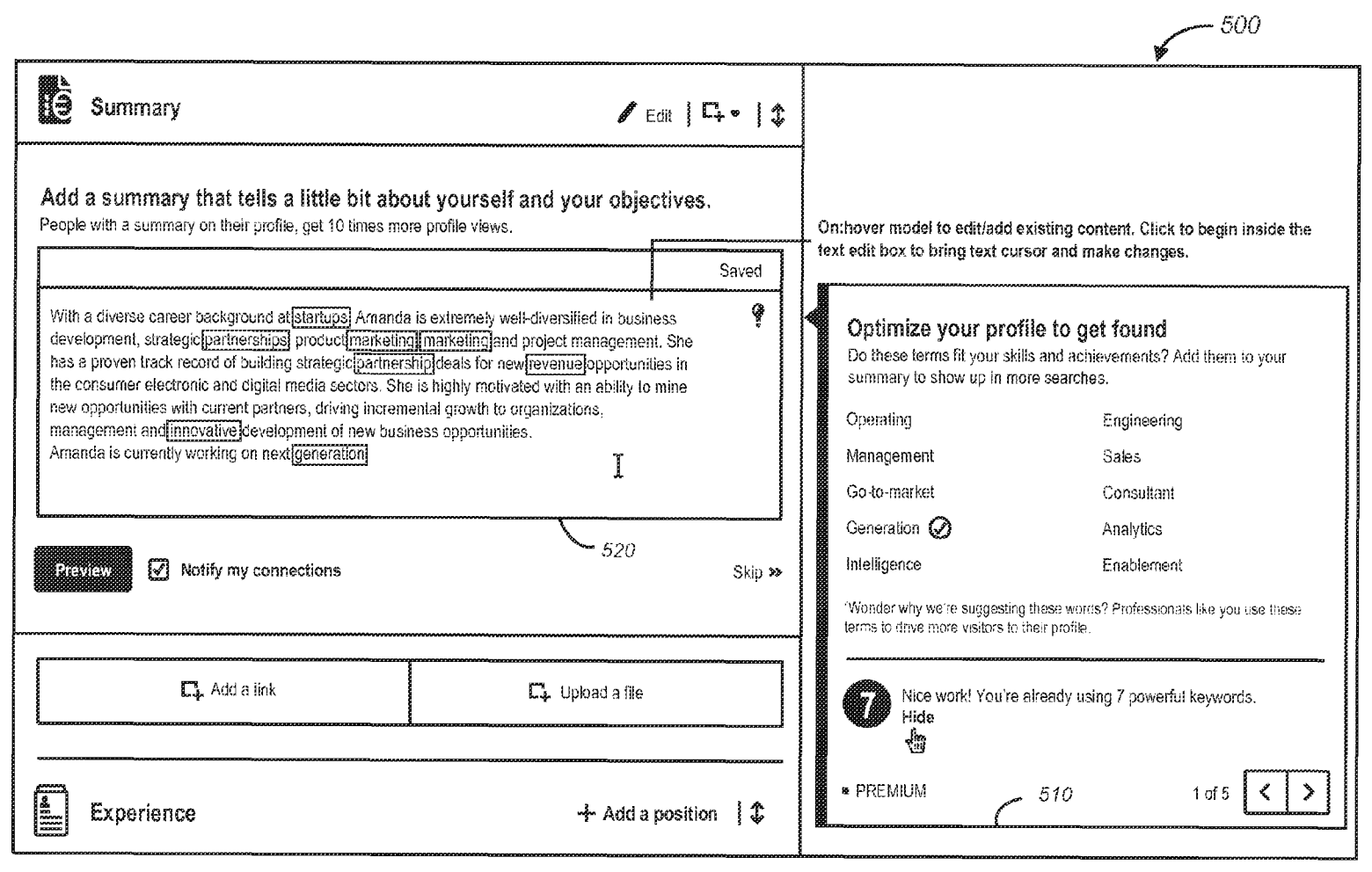

In order to aid a user in writing a professional summary, it may be beneficial to utilize a system for generating suggested keywords for social network members (also referred to as suggested keywords system). A user (a member of the social networking system), who is being provided with suggested keywords, may be referred to as a target member. A profile associated with a target member may be referred to as a target profile. A suggested keywords system, in one example embodiment, examines phrases that appear in profiles maintained by the on-line social networking system that are similar to the target profile and identifies those words and phrases that are most prominent in these profiles. These most prominent words and phrases may be presented to the target member as suggested keywords to be included in the member's professional summary. An example screen 500 that illustrates presentation of suggested keywords to a user who is in the process of editing his professional summary is shown in FIG. 5.

It will be noted, that a phrase is to be understood to be an n-gram: a contiguous sequence of n items from a given sequence of text. In one example embodiment, the prominence of a phrase is expressed by a rank value. The phrases with the higher rank are considered to be more relevant in describing professional background of the target member. The target member may thus be presented with a predetermined number of top-ranking phrases as suggested keywords to be included in his professional summary. Respective ranks of the phrases with respect to a target member profile and its associated sub-network of similar profiles may be computed based on the frequency of occurrence of each of the phrases in each of the profiles in the sub-network, as well as frequency of occurrence of the phrases in search queries for which the target member profile or any of the similar profiles appear as results, and also based on respective similarity values for pairs of profiles, where each pair has the target profile and another profile from the sub-network.

The ranking of the phrases for a target profile may be recalculated periodically and stored in a database. The ranking of the phrases for a target profile may also be calculated on-demand, e.g., in response to detecting that a user has accessed a web page in the on-line social networking system that permits creating or editing of a summary section of the profile that represents the user.

In operation, according to one embodiment, the suggested keywords system may first determine a sub-network of similar member profiles for the target profiles in the on-line social network system. Similarity (also referred to as affinity) between two profiles maybe determined based on comparing various respective units of the member profiles, such respective positions, job descriptions, listed skills, education degrees, group memberships, etc. The system then extracts n-grams (phrases) from the profiles in the sub-network. The extracted profile data may be filtered to eliminate certain types of words and phrases, such as, e.g., non-English text, common or offensive words, proper nouns, email addresses, etc. For each member profile in the sub-network, determine frequencies of occurrence of each phrase from the extracted phrases. For example, a record indicating that a member profile identified by a member ID "22330283" contains ten occurrences of the phrase "management" and 5 occurrences of the phrase "business operations.") This record may be represented as follows:

22330283, {("management", 10), ("business operations", 5), . . . }

For each pair of phrases $w_i$ and $w_j$, the system may determine a correlation value $C_{ij}$ with respect to the target profile, as expressed by equation (1) below:

$$C_{ij} = \sum_{\substack{members \\ k}} S_k w_{ki} w_{kj}, \qquad (1)$$

where $S_k$ is a value indicating similarity between the target profile and the k profile, $w_{ki}$ is a value indication the frequency of occurrence of the phrase $w_{ki}$ in the k profile, and $w_{kj}$ is a value indication the frequency of occurrence of the phrase $w_j$ in the k profile. The values $w_{ki}$ and $w_{kj}$ may also represent occurrence frequencies of the respective phrases within the k-th profile weighted by factors dependent on the number of search queries in which the respective phrases appear.

Similarity $S_k$ may be determined by a weighted combination of similarities between different sections of the target member profile and the k-th member profile. Similarities between pairs of sections of two profiles may be computed by representing each profile section in a vector space and then applying a dot product, cosine or another similarity function in that space. Depending on the specific section of the profile, dimensions of the corresponding vector space may represent, for example, all possible n-grams, skills, education levels, seniority levels, group memberships, and other relevant information. Weights for combining similarities between sections into a single profile similarity score may, for example, be determined heuristically, or by a statistical model trained to predict profile co-views as a function of pairwise similarities between different sections of the two profiles.

Figure 6:
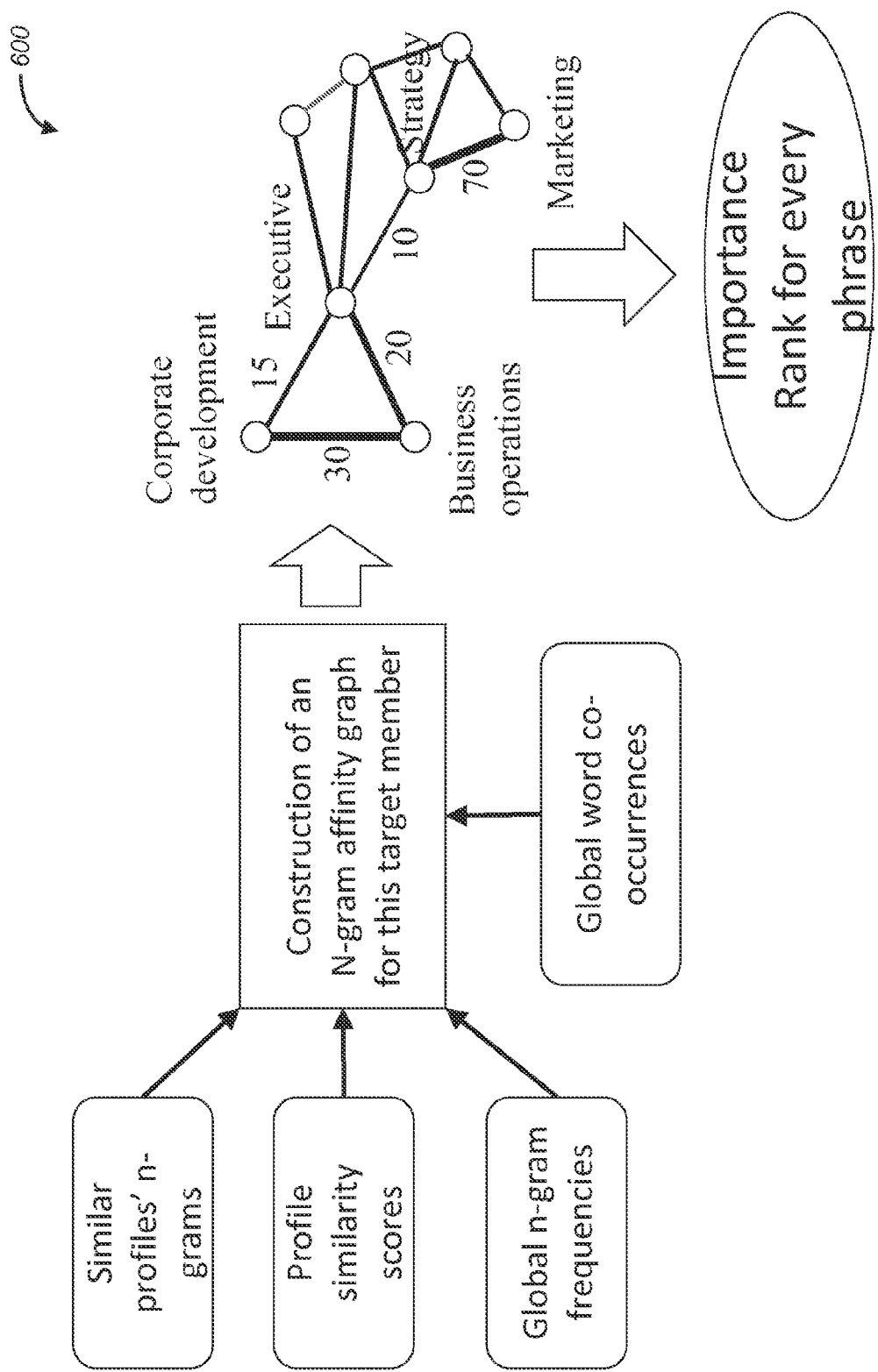
FIG. 6 is an example diagram illustrating generating respective ranks for phrases extracted form a sub-network of similar profiles in an on-line social network system, utilizing a graph-based approach, in accordance with an example embodiment.
Figure 7:
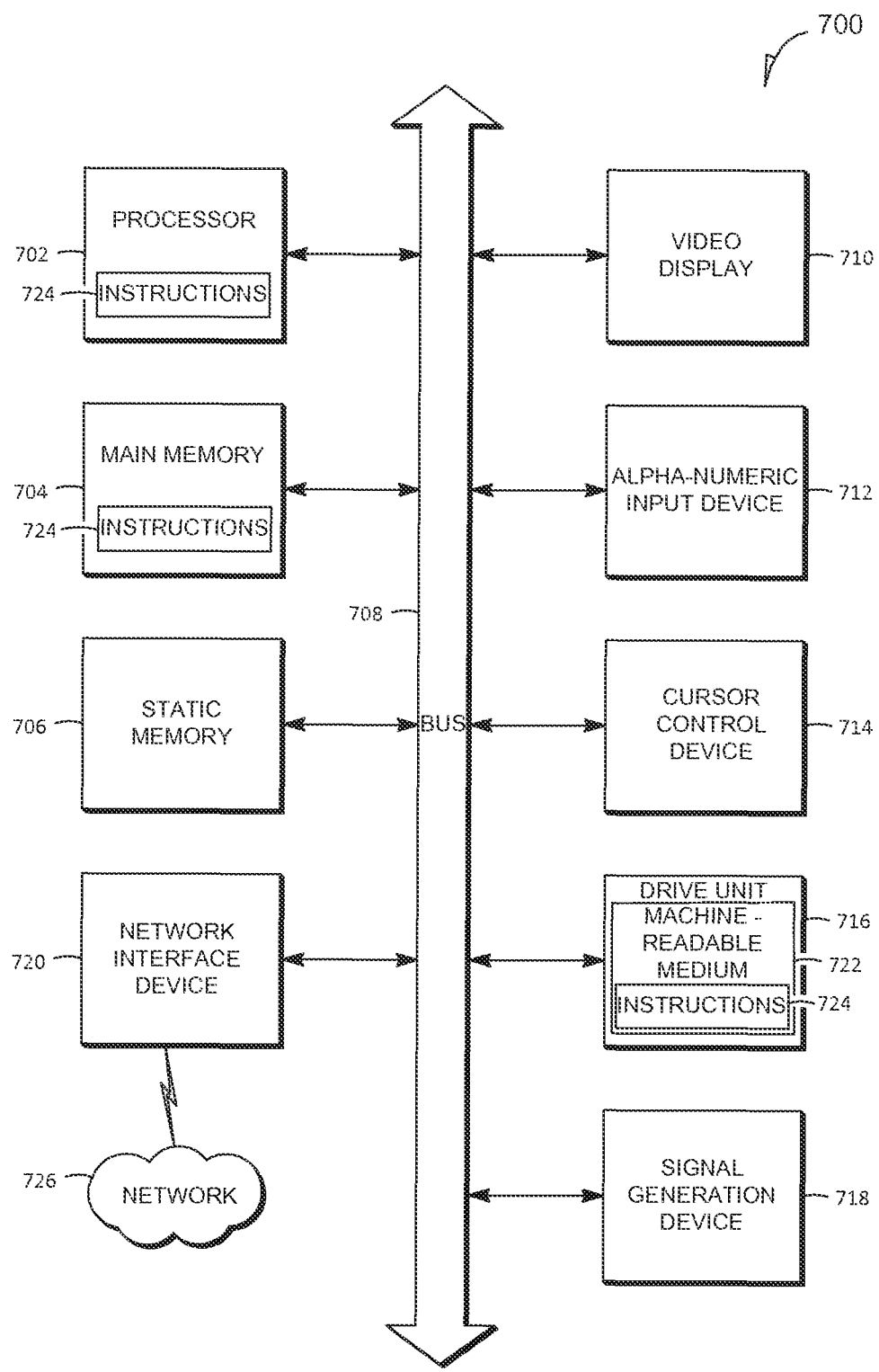
FIG. 7 is a diagrammatic representation of an example machine in the form of a computer system within which a set of instructions, for causing the machine to perform any one or more of the methodologies discussed herein, may be executed.

The suggested keywords system may then construct a graph, where the nodes of the graph represent phrases extracted from the sub-network of member profiles with respect to the target profile and the edges represent respective correlation values $C_{ij}$. An example graph is shown in FIG. 6, where the example graph includes nodes representing phrases "Corporate development," "Business operations," "Executive," "Strategy," "Marketing," etc. The values along the edges represent respective correlation values for the pairs of phrases. For example, the correlation value for ("Corporate development" "Business operations") pair is 30. A graph, where the nodes of the graph represent phrases extracted from the sub-network of member profiles with respect to the target profile and the edges represent respective correlation values $C_{ij}$ may be referred to as an affinity graph.

The suggested keywords system may then apply a ranking algorithm (e.g., a random walk algorithm) to the affinity graph in order to derive a rank value for each phrase represented by a node in the affinity graph. A certain number of highest-ranking phrases maybe stored in a database accessible by the on-line networking system.

According to a further embodiment, a suggested keywords system may be configured to generate, for n-grams that are present in the sub-network of member profiles that are similar to the target profile in the on-line social networking system, a so-called discriminative strength value. A discriminative strength value, computed for a particular n-gram with respect to a certain sub-network of member profiles, expresses probability of that particular n-gram being indicative of a member profile that contains that particular n-gram belonging to the sub-network. As the sub-network of profiles is determined with respect to a target profile, a certain number of n-grams with the highest discriminative strength values are selected as suggested keywords to be presented to a member represented by the target profile.

A discriminative strength value for an n-gram may be computed utilizing various statistical tools, e.g., a statistical hypothesis test for association between two variables. For example, in determining a discriminative strength value for an n-gram, a statistical too may take into account the number of profiles in the sub-network that include that n-gram and the number of profiles outside the sub-network that include that n-gram. A so-called indicator variable may be used to indicate whether a certain member profile in the on-line social network system is included in the sub-network of profiles that have been identified as similar to the target profile. The derived statistic for an n-gram—discriminative strength value—may be viewed as measuring the degree of correlation, or statistical dependence, between an n-gram and an indicator variable. Various statistical hypothesis tests for independence between variables may be used to assess the degree of dependence between two variables, an n-gram and an indicator variable, based on paired observations on those variables. Some examples of statistical hypothesis tests for independence between variables, which could be applied for obtaining discriminative values include G-squared, Pearson's chi-squared, Kruskal-Wallis.

A statistical tool may also utilize additional information in calculating a discriminative strength value for an n-gram. For example, a statistical tool may also utilize a similarity value representing similarity between the target profile and a profile that is being examined with respect to the presence or absence of the n-gram in that profile.

Once respective discriminative strength values have been calculated for n-grams extracted from member profiles that belong to the sub-network of member profiles, the suggested keywords system selects a pre-determined number of n-grams with the highest discriminative strength values and presents these n-grams to the member represented by the target profile as suggested keywords. Conversely, the n-grams with respective discriminative strength values below a certain threshold may be discarded as being of little or no significance with respect to describing a member represented by the target profile.

The suggested keywords system may also be configured to determine whether the summary section of the target profile already contains any of the high-scoring n-grams and, if so, provide a notification to the member represented by the target profile. For example, the suggested keywords system may be configured to identify a certain number of top-scoring n-grams. If the summary section of the target profile already contains one or more of these identified high-scoring n-grams, the suggested keywords system presents a subset of the top-scoring n-grams that does not include those n-grams that are already present in the summary section. A notification may be provided as a message stating that the member is already using certain powerful keywords in their summary. The keywords that appear in the summary section of the target profile that correspond to n-grams having their respective discriminative strength values within a certain number of top-scoring n-grams may be highlighted in the summary section of the target profile, as shown in FIG. 5 (area 520). A message of encouragement may also be provided, such as, e.g., "Nice work! You're already using 7 powerful keywords," as shown in FIG. 5 (area 510).

An example method and system for generating suggested keywords for social network members may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a suggested keywords system 144. The suggested keywords system 144 may be configured to determine, for a member represented by a target profile in the on-line social network system 142, phrases (also referred to as summary keywords or keywords) that are be representative of the member's professional skills and experience. In one example embodiment, in order to determine summary keywords for a target profile, the suggested keywords system 144 identifies a sub-network of profiles in the on-line social network system 142 that are similar to the target profile, extracts phrases from the profiles in the sub-network and calculates respective ranks or scores for the phrases.

These respective ranks or scores for the phrases may be calculated based on the similarity values determined for pairs of profiles in the sub-network and also based on respective frequency of occurrences of phrases in the profiles. In some embodiments, the respective ranks or scores for the phrases may be in the form of discriminative strength values. A discriminative strength value, computed for a particular phrase with respect to a certain sub-network of member profiles, expresses the probability of that particular phrase being indicative of a member profile that contains that particular phrase belonging to the sub-network.

The suggested keywords system 144 may be configured to store the top-ranking phrases (e.g., 100 top-ranking phrases) as associated with the target profile, e.g., as ranked phrases 154 in the database 150. The suggested keywords system 144 may be configured to present a certain number of top-ranking words to the member represented by the target profile, e.g., when the member is accessing his profile page for editing the profile. An example suggested keywords system 144 is illustrated in FIG. 2.

Figure 2:
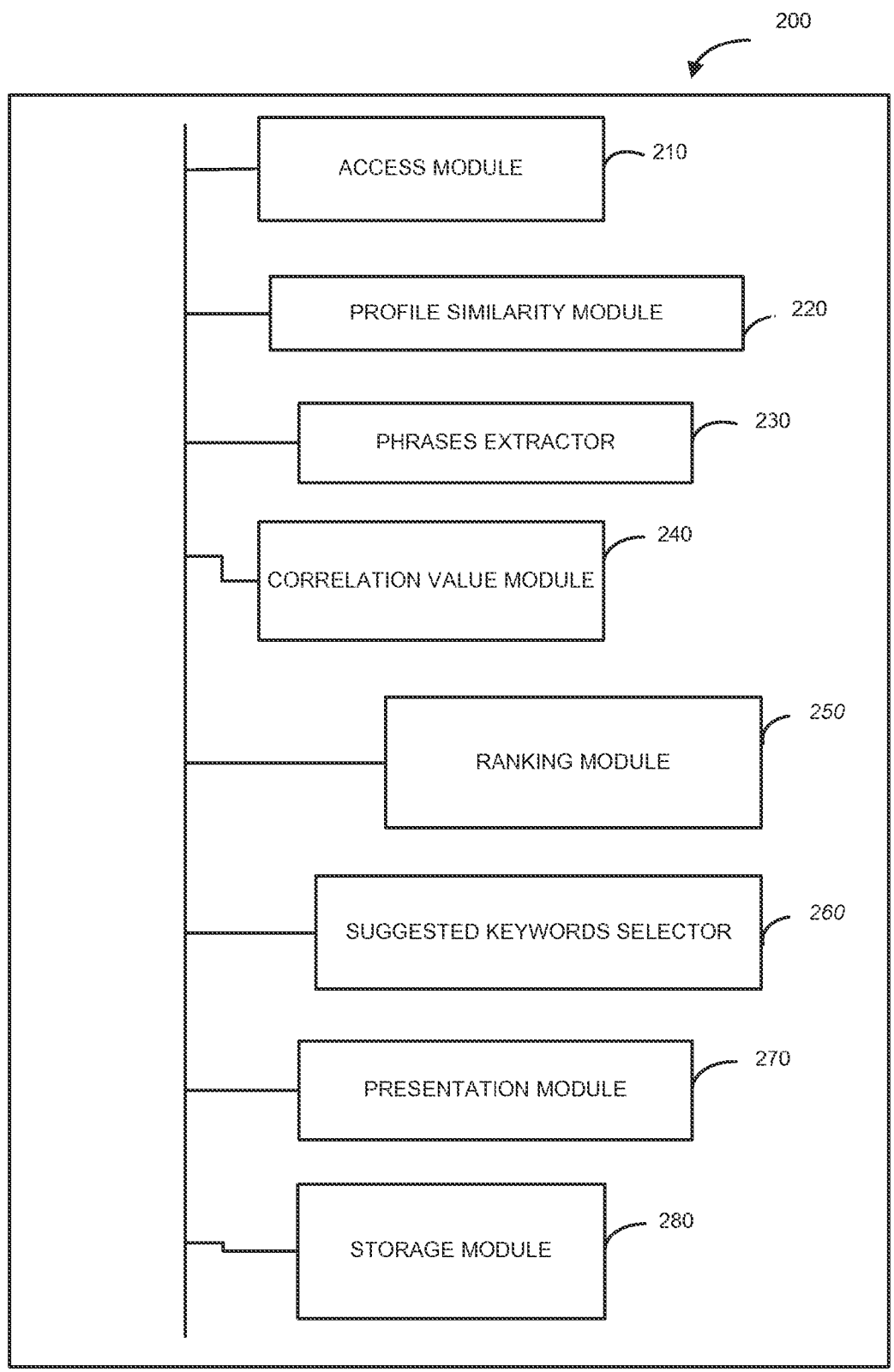
FIG. 2 is block diagram of a system to suggest keywords to a social network member, in accordance with one example embodiment.

FIG. 2 is a block diagram of a system 200 to generate keywords that members of an on-line social network may use in their profile summary, in accordance with one example embodiment. As shown in FIG. 2, the system 200 includes an access module 210, a profile similarity module 220, a phrases extractor 230, a correlation value module 240, and a ranking module 250. The access module 210 may be configured to access a target member profile in the on-line social network system 142 of FIG. 1. The profile similarity module 220 may be configured to determine, from profiles in the on-line social network system 142, a plurality of similar member profiles. The similar member profiles are those profiles that are similar to the target member profile. As mentioned above, the plurality of similar member profiles and the target profile may be termed a sub-network of similar profiles in the on-line social network system. The phrases extractor 230 may be configured to extract a plurality of phrases from the sub-network of similar profiles.

The correlation value module 240 may be configured to calculate, for each pair of phrases from the plurality of phrases, a correlation value. The correlation value module 240 may be configured to calculate a correlation value for a first phrase and a second phrase from the plurality of phrases, utilizing frequencies of occurrence of the first phrase in member profiles from the sub-network of similar profiles and frequencies of occurrence of the second phrase in member profiles from the sub-network of similar profiles. The correlation value module 240 may be configured to also utilize similarity values determined for pairs of member profiles from the sub-network of similar profiles, e.g., as described above with reference to equation (1) shown above. The correlation value module 240 may be configured to also utilize frequencies of occurrence of each of the two phrases in search queries.

The ranking module 250 may be configured to determine a rank for each phrase in the plurality of phrases, based on respective correlation values of pairs of phrases from the plurality of phrases. In one embodiment, the ranking module 250 may be configured to construct an affinity graph, such that the nodes of the affinity graph represent respective phrases from the plurality of phrases and the edges in the affinity graph represent correlation values for respective nodes attached to the edges. The ranking module 250 may apply a ranking algorithm, such as the random walk algorithm, to the affinity graph to determine a rank for each phrase in the plurality of phrases represented by the nodes in the affinity graph.

In a further embodiment, the ranking module 250 may be configured to calculate respective discriminative strength values for phrases (also referred to as n-grams). As explained above, a discriminative strength value for a phrase expresses probability of the phrase being indicative of a member profile that contains the phrase belonging to the sub-network of similar profiles. The ranking module 250 may be configured to derive a statistic for a phrase, termed a discriminative strength value, which may be viewed as proportionality between the phrase and an indicator variable, where the indicator variable indicates whether a certain member profile in the on-line social network system is included in the sub-network of profiles that have been identified as similar to the target profile. In one embodiment, the ranking module 250 may be configured to employ Pearson's chi-squared test to assess whether paired observations on two variables, a phrase and an indicator variable, are independent of each other. The ranking module 250 may be configured to calculate respective discriminative values for phrases utilizing similarity values determined for pairs of member profiles from the sub-network of similar profiles. The ranking module 250 may be configured to recalculate, periodically, a rank or score for each phrase in the plurality of phrases.

Also shown in FIG. 2 are a suggested keywords selector 260, a presentation module 270 and a storage module 280. The suggested keywords selector 260 may be configured to select a predetermined number of top-scoring (or top-ranking) phrases, based on the results produced by the ranking module 250. For example, in an embodiment, where respective ranks of phrases is determined utilizing an affinity graph and respective correlation values of pairs of phrases, the suggested keywords selector 260 may be selecting a predetermined number of phrases that have the highest rank. In an embodiment, where the ranking module 250 derives respective discriminative strength values for phrases, the suggested keywords selector 260 may be selecting a predetermined number of phrases that have the highest discriminative strength values. The presentation module 270 may be configured to present the selected phrases to a member represented by the target member profile. The storage module 280 may be configured to store respective discriminative strength values or ranks determined by the ranking module 250 for future use, e.g., in the database 150 of FIG. 1 as ranked phrases 154.

The suggested keywords selector 260 may also be configured to determine that the summary section of the target profile contains one or more phrases that are within a certain threshold number of phrases having the highest respective ranks (e.g., the highest discriminative values). The presentation module 270 may be configured to present the selected phrases to a member represented by the target member profile, excluding the one or more phrases that are present in the summary section of the target profile. The presentation module 270 may also be configured to present a notification to the member represented by the target profile, e.g., in response to the determining that the summary section of the target profile contains the one or more phrases. A notification may be a message of encouragement, such as, e.g., "Nice work! You're already using 7 powerful keywords," as shown in FIG. 5 (area 510). Some operations performed by the system 200 may be described with reference to FIG. 3.

Figure 3:
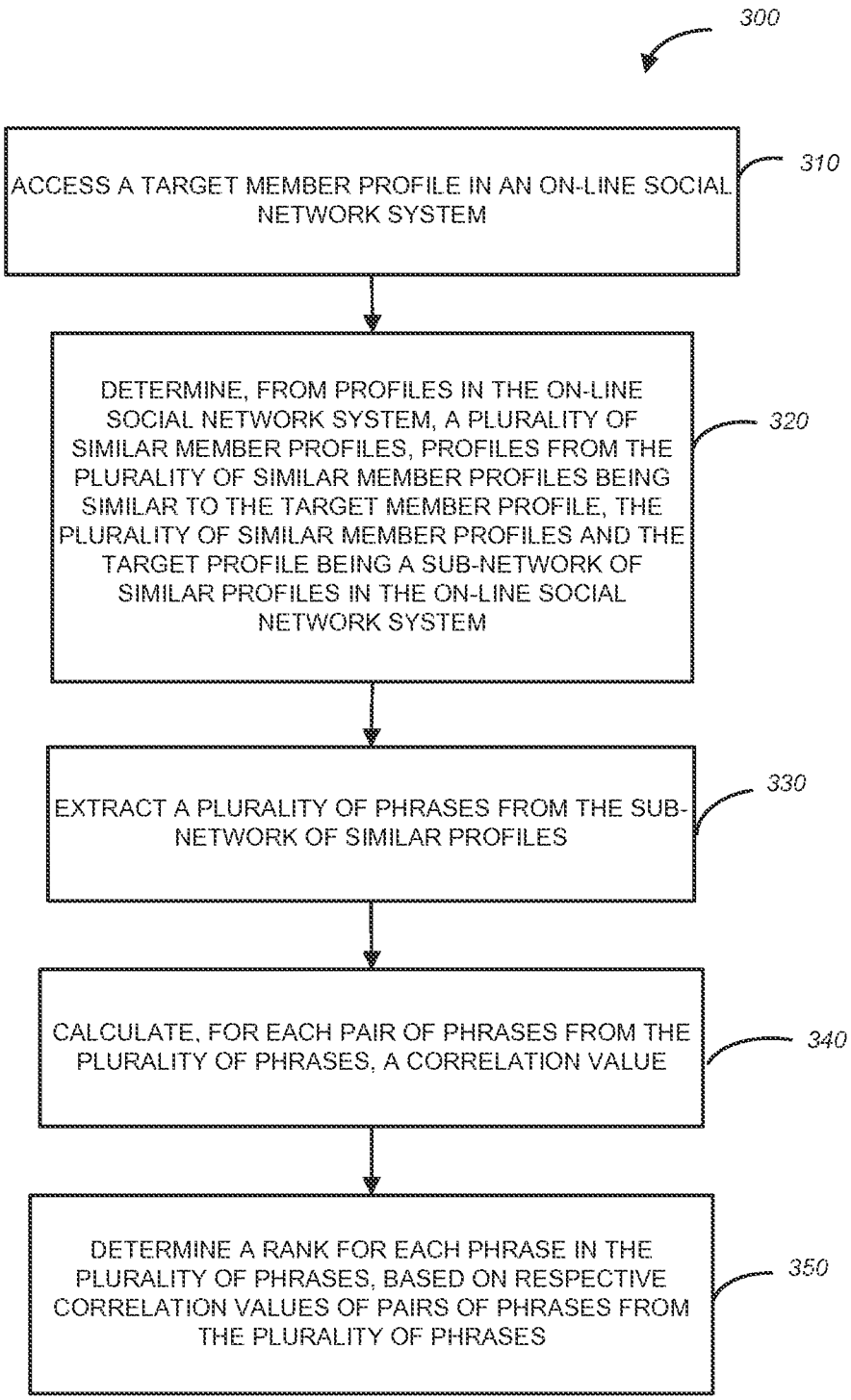
FIG. 3 is a flow chart of a method to suggest keywords to a social network member, utilizing a graph-based approach, in accordance with an example embodiment.

FIG. 3 is a flow chart of a method 300 to generate keywords that members of an on-line social network may use in their profile summary, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the access module 210 accesses a target member profile in the on-line social network system 142 of FIG. 1. At operation 320, the profile similarity module 220 determines, from profiles in the on-line social network system 142, a plurality of similar member profiles. As mentioned above, the similar member profiles are those profiles that are similar to the target member profile. These similar profiles, together with the target profile, make up a sub-network of similar profiles. At operation 330, the phrases extractor 230 extracts a plurality of phrases from the sub-network of similar profiles. The correlation value module 240 calculates a correlation value for each pair of phrases from the plurality of phrases, at operation 340. At operation 320, the ranking module 250 determines a rank for each phrase in the plurality of phrases, based on respective correlation values of pairs of phrases from the plurality of phrases. As explained above, the calculating of respective ranks for phrases may include constructing an affinity graph with the nodes representing respective phrases from the plurality of phrases and the edges representing correlation values for associated nodes, and applying a ranking algorithm to the affinity graph.

Figure 4:
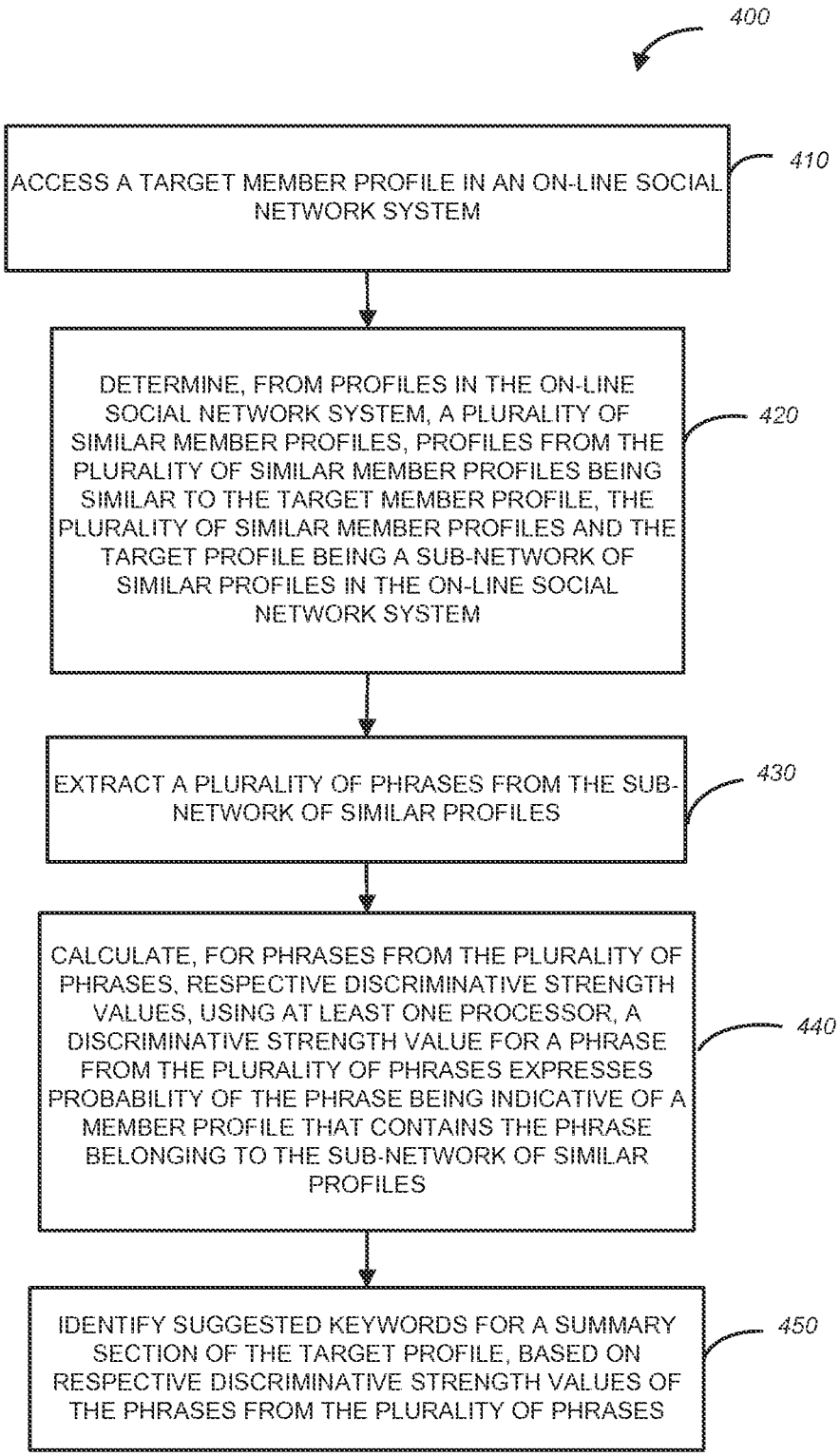
FIG. 4 is a flow chart of a method to suggest keywords to a social network member, utilizing discriminative strength values, in accordance with an example embodiment.

FIG. 4 is a flow chart of a method 400 a method to suggest keywords to a social network member, utilizing discriminative strength values, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 4, the method 400 commences at operation 410, when the access module 210 of FIG. 2 accesses a target member profile in the on-line social network system 142 of FIG. 1. At operation 420, the profile similarity module 220 of FIG. 2 determines, from profiles in the on-line social network system 142, a plurality of similar member profiles. As mentioned above, the similar member profiles are those profiles that are similar to the target member profile. These similar profiles, together with the target profile, make up a sub-network of similar profiles. At operation 430, the phrases extractor 240 of FIG. 2 extracts a plurality of phrases from the sub-network of similar profiles. The ranking module 250 of FIG. 2 calculates respective discriminative strength values for phrases (also referred as n-grams) at operation 440. As explained above, a discriminative strength value for a phrase expresses probability of the phrase being indicative of a member profile that contains the phrase belonging to the sub-network of similar profiles. At operation 450, the suggested keywords selector 260 of FIG. 2 identifies suggested keywords for a summary section of the target profile, based on the respective discriminative strength values of the phrases. In one embodiment, the suggested keywords selector 260 suggested keywords for the summary section of the target profile in response to detecting an access request to a webpage that includes a summary section of the target member profile.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

FIG. 6 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to suggest keywords to a social network member has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A method comprising:
 accessing a target member profile representing a member in an on-line social network system, the target member profile associated with a profile summary user interface (UI), the profile summary UI comprising a display area suitable for receiving user input;
 determining, from profiles representing further respective members in the on-line social network system, a plurality of similar member profiles, profiles from the plurality of similar member profiles being similar to the target member profile, the plurality of similar member profiles and the target profile being a sub-network of similar profiles in the on-line social network system;
 from the sub-network of similar profiles, extracting a plurality of phrases;
 calculating, for phrases from the plurality of phrases, respective discriminative strength values, using at least one processor, a discriminative strength value for a phrase from the plurality of phrases expresses probability of the phrase being indicative of a member profile that contains the phrase belonging to the sub-network of similar profiles, wherein the calculating of a discriminative strength value for a particular phrase from the plurality of phrases comprises utilizing the number of profiles in the sub-network of similar profiles that include that particular phrase and the number of profiles outside the sub-network of similar profiles that include that particular phrase;

identifying suggested keywords for presentation in a further display area of the summary UI of the target profile, based on respective discriminative strength values of the phrases from the plurality of phrases; and causing presentation of the suggested keywords in the further display area of the profile summary UI subsequent to the accessing of the target member profile.

2. The method of claim 1, wherein the identifying of the suggested keywords for the summary section of the target profile is in response to detecting an access request to a webpage comprising the display area suitable for receiving user input for the summary section of the target member profile.

3. The method of claim 1, comprising storing one or more phrases from the plurality of phrases and their respective discriminative strength values for future access.

4. The method of claim 1, comprising:
selecting a predetermined number of phrases from the plurality of phrases, based on their respective discriminative strength values.

5. The method of claim 4, comprising:
determining that the summary section of the target profile contains one or more phrases that are within a certain threshold number of phrases having highest respective discriminative values; and
presenting the selected phrases to a member represented by the target member profile, excluding the one or more phrases that are present in the summary section of the target profile.

6. The method of claim 5, comprising presenting a notification to the member represented by the target profile, in response to the determining that the summary section of the target profile contains the one or more phrases.

7. The method of claim 4, wherein the presenting of the selected phrases to the member is in response to detecting an access request to a webpage comprising the display area suitable for receiving user input for the summary section of the target member profile.

8. The method of claim 1, comprising recalculating, periodically, a discriminative value for each phrase in the plurality of phrases.

9. The method of claim 1, wherein the calculating of a discriminative value for each phrase in the plurality of phrases comprises utilizing similarity values determined for pairs of member profiles from the sub-network of similar profiles.

10. The method of claim 1, wherein the calculating of the respective discriminative strength values for phrases from the plurality of phrases comprises utilizing a statistical hypothesis test for independence between variables.

11. A computer-implemented system comprising:
at least one processor coupled to a memory;
an access module to access a target member profile representing a member in an on-line social network system, using the at least one processor, the target member profile comprising a summary section associated with a profile summary user interface (UI), the profile summary UI comprising a display area suitable for receiving user input;

a profile similarity module to determine, using the at least one processor, from profiles representing further respective members in the on-line social network system, a plurality of similar member profiles, profiles from the plurality of similar member profiles being similar to the target member profile, the plurality of similar member profiles and the target profile being a sub-network of similar profiles in the on-line social network system;

a phrases extractor to extract a plurality of phrases from the sub-network of similar profiles, using the at least one processor;

a ranking module to calculate, for phrases from the plurality of phrases, respective discriminative strength values, using at least one processor, a discriminative strength value for a phrase from the plurality of phrases expresses probability of the phrase being indicative of a member profile that contains the phrase belonging to the sub-network of similar profiles, wherein the calculating of a discriminative strength value for a particular phrase from the plurality of phrases comprises utilizing the number of profiles in the sub-network of similar profiles that include that particular phrase and the number of profiles outside the sub-network of similar profiles that include that particular phrase;

a suggested keywords selector to identify suggested keywords for presentation in a further display area of the summary UI of the target profile, based on respective discriminative strength values of the phrases from the plurality of phrases, using the at least one processor; and a presentation module to cause presentation of the suggested keywords in the further display area of the profile summary UI subsequent to the accessing of the target member profile.

12. The system of claim 11, wherein the suggested keywords selector is to identify the suggested keywords for the summary section of the target profile in response to detecting an access request to a webpage comprising the display area suitable for receiving user input for the summary section of the target member profile.

13. The system of claim 11, comprising a storing module to store one or more phrases from the plurality of phrases and their respective discriminative strength values for future access, using the at least one processor.

14. The system of claim 11, wherein the suggested keywords selector is to select a predetermined number of phrases from the plurality of phrases, based on their respective discriminative strength values.

15. The system of claim 14, wherein:
the suggested keywords selector is to determine that the summary section of the target profile contains one or more phrases that are within a certain threshold number of phrases having highest respective discriminative values; and
the presentation module is to present the selected phrases to a member represented by the target member profile, excluding the one or more phrases that are present in the summary section of the target profile.

16. The system of claim 15, wherein the presentation module is to present a notification to the member represented by the target profile, in response to the determining that the summary section of the target profile contains the one or more phrases.

17. The system of claim 14, wherein the presentation module is to present the selected phrases to the member in response to detecting an access request to a webpage comprising the display area suitable for receiving user input for the summary section of the target member profile.

18. The system of claim 11, wherein the ranking module is to recalculate, periodically, a discriminative value for each phrase in the plurality of phrases.

19. The system of claim 11, wherein the ranking module is to calculate a discriminative value for each phrase in the plurality of phrases utilizing similarity values determined for pairs of member profiles from the sub-network of similar profiles.

20. A machine-readable non-transitory storage medium having instruction data to cause a machine to perform operations comprising:
- accessing a target member profile representing a member in an on-line social network system, the target member profile comprising a summary section associated with a profile summary user interface (UI), the profile summary UI comprising a display area suitable for receiving user input;
- determining, from profiles representing further respective members in the on-line social network system, a plurality of similar member profiles, profiles from the plurality of similar member profiles being similar to the target member profile, the plurality of similar member profiles and the target profile being a sub-network of similar profiles in the on-line social network system;
- extracting a plurality of phrases from the sub-network of similar profiles;
- calculating, for phrases from the plurality of phrases, respective discriminative strength values, a discriminative strength value for a phrase from the plurality of phrases expresses probability of the phrase being indicative of a member profile that contains the phrase belonging to the sub-network of similar profiles, wherein the calculating of a discriminative strength value for a particular phrase from the plurality of phrases comprises utilizing the number of profiles in the sub-network of similar profiles that include that particular phrase and the number of profiles outside the sub-network of similar profiles that include that particular phrase; and
- identifying suggested keywords for presentation in a further display area of the summary UI of the target profile, based on respective discriminative strength values of the phrases from the plurality of phrases.

* * * * *